2,978,407
MOLECULAR SIEVE SEPARATION PROCESS

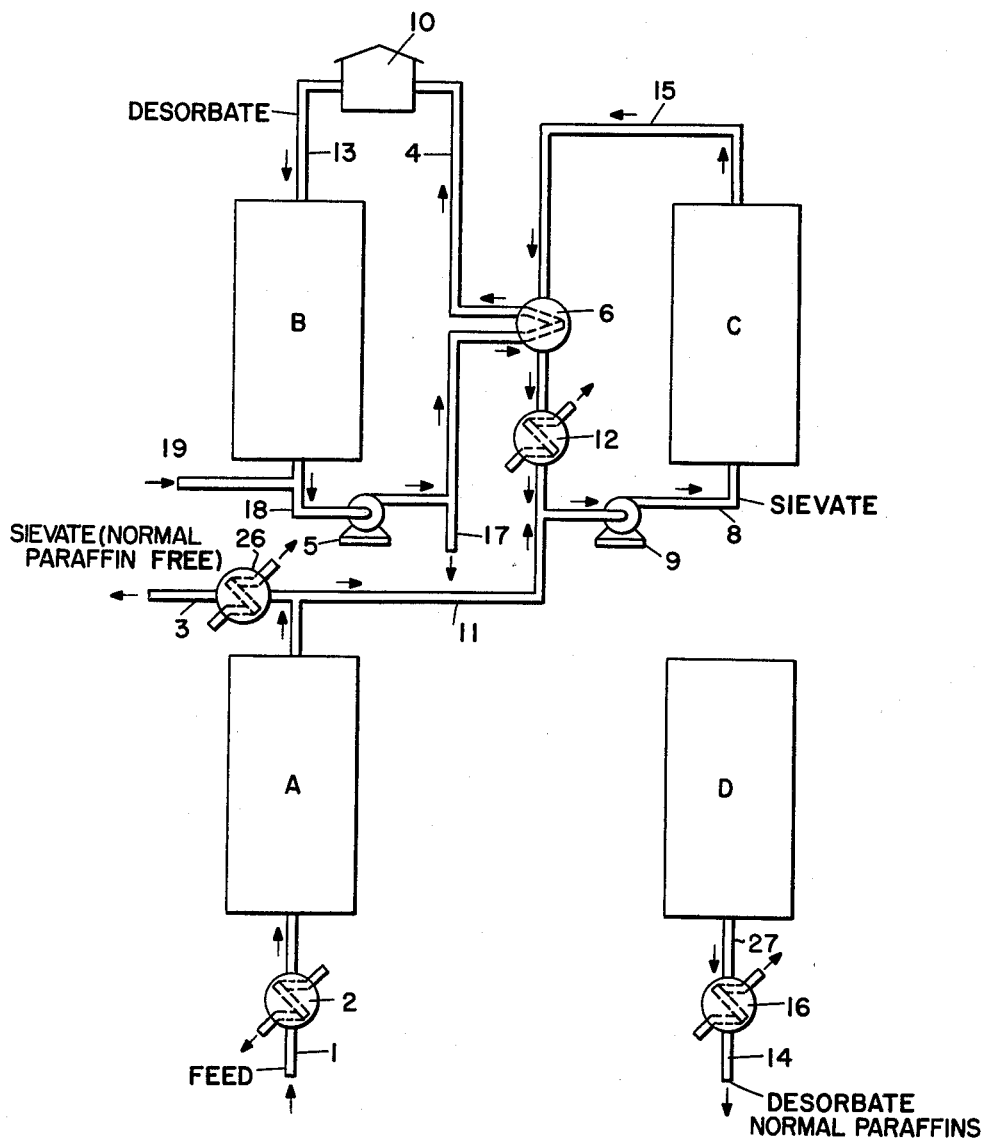

John R. Tuttle, Summit, George F. Feldbauer, Jr., Cranford, and Ronald C. Hoke, Elizabeth, N.J., assignors to Esso Research and Engineering Company, a corporation of Delaware Filed May 28, 1958, Ser. No. 738,442

7 Claims. (Cl. 208—310)

The present invention relates to an improved process for the efficient and economical separation and segregation of straight chain or aromatic hydrocarbons from mixtures comprising straight chain hydrocarbons, branched hydrocarbons, cyclic naphthenes and aromatics. The invention is particularly concerned with a method of improving the overall thermal efficiency of a molecular sieve separation process including both the adsorption stage and the desorption stage. In accordance with the present process, paraffin or aromatic hydrocarbons are efficiently adsorbed on the sieve and desorbed from the sieve with excellent thermal efficiency.

It is well known in the art that various adsorbents, such as molecular sieves, will separate certain hydrocarbon components from a mixture due to a selected affinity for one or more components of the mixture as, for example, a mixture comprising straight chain hydrocarbons, branched hydrocarbons, cyclic naphthenes and aromatics. It has been known for some time that these zeolites, both naturally-occurring and synthetic, have the property of separating normal from isomeric branched chain hydrocarbons as well as from cyclic and aromatic admixtures. Other types of zeolites have the ability to segregate aromatic hydrocarbons from mixtures containing the same as, for example, a mixture comprising straight chain hydrocarbons, cyclic naphthenes, aromatics and branched type hydrocarbons. These zeolites have crystalline structures containing a large number of small cavities interconnected by a number of still smaller holes or pores, the latter being of exceptional uniform size. The pores may vary in diameter from 3 to 5 Angstrom units and up to 12 to 15 units or more. For a particular molecular sieve material, however, the pore sizes are substantially uniform and accordingly the material normally will be designated by the characteristic size of its pores.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g., sodium and/or calcium, magnesium, etc. Analcite has the empirical formula $NaAlSi_2O_6 \cdot H_2O$. Barrer (U.S. Patent No. 2,306,610) teaches that all or part of the sodium is replaceable by calcium to yield, on dehydration, a molecular sieve having the formula $$(CaNa_2)Al_2Si_4O_{12} \cdot 2H_2O$$

Black (U.S. Patent No. 2,522,426) describes a synthetic molecular sieve having the formula $4CaO \cdot Al_2O_3 \cdot 4SiO_2$.

The synthesis of molecular sieves having uniform pore sizes of 4 and 5 Angstrom units may be accomplished by mixing an aqueous solution of an alkali metal silicate having a ratio of alkali metal oxide/$SiO_2$ of about 0.8 to 1 or higher with a solution of sodium aluminate having a ratio of $Na_2O$ to $Al_2O_3$ of about 1/1–3/1 at a temperature of from about 160° to about 215° F. in such proportions as to give a ratio of $SiO_2$ to $Al_2O_3$ in the mixture of 0.5–3/1. The mixture is held at the stated temperatures for a period of time sufficient to form a crystalline sodium alumino-silicate, which is a molecular sieve material having a uniform pore size of about 4 Angstrom units. A pore size of about 5 Angstrom units may be produced in this material by base exchange reaction with an alkaline earth metal such as calcium, in the form of calcium chloride, for example. In either instance, the molecular sieve material produced is water washed and then activated by calcining.

The synthesis of a molecular sieve material having a pore size of about 13 Angstrom units may be accomplished by mixing an aqueous solution of an alkali metal silicate having a ratio of alkali metal oxide/$SiO_2$ of about 1/1 or higher with a solution of sodium aluminate having a ratio of $Na_2O$ to $Al_2O_3$ of 1/1–3/1 at 160° to about 250° F. in proportions such as to give a ratio of $SiO_2$ to $Al_2O_3$ in the mixture of 3/1–10/1. This mixture is then held at the stated temperatures for at least an hour, and preferably longer, thereby producing the molecular sieve material desired. The recovered sieve material is water washed and activated by calcining.

A large number of other naturally-occurring zeolites have molecular sieve activity, i.e., the ability to selectively adsorb certain components or component portions of a gaseous mixture. In some cases this selectivity stems from the fact that only molecules small enough to enter the pores will be adsorbed. This is the case with respect to the selective adsorption of normal paraffins with a 5 A. molecular sieve wherein only the normal paraffins will enter the 5 A. cavity. Molecular size alone, however, is not the sole basis for selective adsorption. For example, the selective removal of aromatic hydrocarbons by means of a 13 A. molecular sieve from a hydrocarbon mixture comprising paraffins, naphthenes and branched hydrocarbons is due to the much higher affinity that the aromatic hydrocarbons have for the molecular sieve surface than do other hydrocarbons.

The 4 A., 5 A. and 13 A. molecular sieve materials are selective for particular types of hydrocarbons. In this respect, the adsorptive characteristics of 4 A., 5 A. and 13 A. molecular sieves are represented in the following table:

| Adsorbed on 4 A. and 5 A. | Adsorbed on 5 A. but not 4 A. | Not Adsorbed on 4 A. or 5 A. | Adsorbed on 13 A. |
|---|---|---|---|
| (1) Ethane. | (1) Propane and higher n-paraffins. | (1) Iso-paraffins. | (1) All hydrocarbons within gasoline boiling range. |
| (2) Ethylene. | (2) Butene and higher n-olefins. | (2) Aromatics. | (2) Aromatics strongly adsorbed. |
| (3) Propylene. | | (2) All cyclics with 4 or more atoms in ring. | (3) Diolefins strongly adsorbed. |

This present invention will, therefore, separate n-paraffins from mixtures of n-paraffins and iso-paraffins and/or cyclic or aromatics by the use of a 5 A. molecular sieve. It will also separate aromatics from mixtures of aromatics and n-paraffins and/or iso-paraffins or cyclic hydrocarbons by the use of a 13 A. molecular sieve.

The desorption of material from molecular sieves may be brought about by reducing the partial pressure of the adsorbed material in the vapor surrounding the sieve by lowering the total pressure of the system or by purging with a suitable inert gas; or by heating the sieve; or by a combination of both techniques.

In most cases the amount of material which can be removed from the sieve by simply reducing the partial pressure is small. For this reason, desorption is generally carried out at a temperature considerably higher than that used in the adsorption step and at a pressure lower than that used in the adsorption step. After desorption, heat must be removed from the sieve to bring it back to the adsorption temperature. This heat must be recovered and reused in order to minimize the overall heat requirements of the process and make the process economical.

In accordance with the present invention employing four stages, the heat required for desorbing is recovered and effectively utilized. The present invention utilizes four reaction vessels operated in a coordinated and integrated manner. In essence, the reaction vessels designated as A, B, C and D are operated with respect to each other and with respect to the particular stage as follows:

| Stage | Vessel | | | |
|---|---|---|---|---|
| | A | B | D | C |
| 1 | Adsorb | Heat | Vacuum | Cool. |
| 2 | Heat | Vacuum | Cool | Adsorb. |
| 3 | Vacuum | Cool | Adsorb | Heat. |
| 4 | Cool | Adsorb | Heat | Vacuum. |
| 1 | Adsorb | Heat | Vacuum | Cool. |

The invention will be specifically described in conjunction with the drawing illustrating one adaptation of the same. The reaction vessels are designated as A, B, C and D. The operation removes normal paraffins by means of 5 A. sieves. In order to simplify the description, the necessary manifolding and valves required to change the respective vessels from stage to stage are not shown. This piping is well understood in the art.

Referring to zone A, which is on adsorption, feed enters through line 1, is heated and vaporized in exchanger zone 2, and enters the bottom of zone A at a temperature of about 250° F. Normal paraffins are adsorbed by the sieve and a normal-paraffin-free product, or sievate, leaves the top of zone A through line 3. This sievate is cooled and condensed in zone 26 and then goes to storage to be further processed as desired. The feed is stopped when the sieve has reached a predetermined degree of saturation so that essentially none of the normal hydrocarbons break through with the sievate into line 3.

While zone A is on the adsorption cycle, zone B is on heating or the desorption cycle. Heating is accomplished by circulating desorbate vapor downwardly through the sieve zone B, through compressor 5, exchanger 6, exchanger or furnace 10, and back to the top of the sieve zone. The desorbate vapor used enters through line 19 either from another sieve zone or from storage. Product desorbate is removed by means of line 17 and handled as desired. The recycled desorbate vapor is heated in exchanger 6 to a temperature in the range from about 350° to 550° F. as, for example, of about 450° F. and further heated in zone 10, which may be a heat exchanger or a furnace, to a temperature in the range of 600° to 700° F. as, for example, of about 650° F. Thus, the sieve temperature at the inlet of zone B will start to rise. As the heating cycle progresses, the sieve at the inlet of zone B will be about 650° F. and that at the outlet will be at a temperature somewhere between 250° and 650° F. A heat front of about 650° F., under the conditions specified, will move downwardly from the top of the sieve zone to the bottom or outlet. When the temperature of the gas leaving vessel B is about 400° to 500° F. as, for example, about 450° F., the heating stage is completed. Zone B may be operated during heating at approximately the same pressure as zone A. However, it is preferred that the pressure in zone B be in the range from 30 to 50 p.s.i.g. This will permit optimum sizing of the compressor.

At the end of the heating cycle, vessel B is swung to the vacuum stage illustrated by vessel D. Vacuum is imposed on vessel D by opening it through line 27 to condenser 16. Condenser 16 is operated at such a temperature as to give the desired vacuum in zone D. This may vary from 400 mm. mercury absolute to 50 mm. mercury absolute. The preferred vacuum will depend upon the condensing temperature available in condenser 16. From economic considerations, the preferred condensing temperature is about 30° to 60° F. With a $C_5$ to $C_6$ hydrocarbon feed this will give a vacuum in zone D of approximately 150 mm. mercury absolute. Product desorbate is removed from the condenser 16 by means of line 14.

While zone A is on adsorption, zone B is on heating and zone D on vacuum, zone C is on the cooling cycle. Cooling is accomplished by circulating sievate, that is, normal-paraffin-free vapor by means of pump or compressor 9 through line 8 upwards through the sieve zone, then through exchanger 6 and exchanger 12. At the start of the cooling phase, a portion of the sievate from zone A is injected into this circuit by means of line 11 and compressor 9. This sievate, or raffinate, vapor is introduced into the bottom of zone C at a temperature in the range of about 200° to 300° F., such as approximately 250° F. and contacts the sieve material which is at about 650° F. The stream leaves the top of zone C at approximately 650° F., and is cooled in exchanger 6 to approximately 450° F., and in exchanger 12 to approximately 250° F., at which point it is recycled back to the bottom of the sieve zone C through compressor 9 and line 8. Under these conditions a cooling front will move upwardly through vessel C and at an intermediate point in the cooling stage the temperature at the bottom of vessel C will be about 250° F. and the temperature at the top of vessel C will be between 250° and 650° F. Cooling will be terminated when the outlet gas from the top of zone C reaches a temperature in the range of 400° to 500° F., such as approximately 450° F.

Heat is exchanged between the sieve on cooling in zone C and the sieve on heating in zone B by means of exchanger 6. Under the conditions of this invention, the heat requirements are minimized by the use of this exchanger. Only a small amount of incremental heat must be supplied through exchanger or furnace 10 and likewise only a minimum removed through exchanger 12.

Pressure in zone C may vary but the preferred pressure is between 30 and 50 p.s.i.g. in order to minimize compressor requirements.

It is also to be understood that further heat economy can be obtained in this process by using incoming feed as the coolant in exchangers 16 and 12.

Typical operating conditions for the treatment of a pentane-hexane fraction are as follows:

Adsorption:
　Pressure, p.s.i.g.------------------------------ 15
　Time, min ------------------------------------- 10
　Feed, gm./100 gm. sieve----------------------- 13.3
　Temp., ° F. (end)------------------------------ 380
Desorbate purge:
　Pressure, p.s.i.g.------------------------------ 15
　Time, min-------------------------------------- 5
　Amount, gm./100 gm. sieve------------------- 1.4
　Temp., ° F. (end)------------------------------ 380
Heating:
　Pressure, p.s.i.g.------------------------------ 30
　Time, min-------------------------------------- 15
　Inlet temp., ° F-------------------------------- 650
　Amount, gm./100 gm. sieve------------------- 50
　Temp., ° F. (end)------------------------------ 590
Vacuum:
　Final pressure, mm. Hg abs------------------- 150
　Time, min-------------------------------------- 12
　Temp., ° F. (end)------------------------------ 565

Repressuring:
    Final pressure, p.s.i.g _____ 30
    Time, min _____ 3
    Amount, gm./100 gm. sieve _____ 1.0
    Temp., ° F. (end) _____ 565
Cooling:
    Pressure, p.s.i.g _____ 30
    Time, min _____ 15
    Inlet temp., ° F _____ 260
    Amount, gm./100 gm. sieve _____ 50
    Temp., ° F. (end) _____ 365

It is to be realized, as pointed out heretofore, that operating conditions may be varied, depending upon the character of the feed stock and other variables. With the coling stage, as described, utilized sievate, it is to be understood that other cooling mediums such as hydrogen, methane, light hydrocarbons and the like, may also be used.

What is claimed is:

1. An integrated process for removal of an adsorbable hydrocarbon constituent from a feed mixture comprising said adsorbable hydrocarbon constituent in admixture with nonadsorbable hydrocarbons of other types, using a solid absorbent comprising a molecular sieve zeolite having pore sizes in the range of from about 3 to about 15 Angstroms adapted to selectively adsorb said adsorbable hydrocarbon, which comprises passing said feed mixture at a relatively low temperature through a first adsorption zone containing a body of said adsorbent, whereby said constituent is selectively adsorbed, withdrawing from said first zone a raffinate that is substantially free of said constituent, said first zone thus being in an adsorption stage, simultaneously passing heated desorbate through a second zone containing a body of said adsorbent that has been saturated to a predetermined degree with said adsorbate while said second zone was just previously in an adsorption stage, said second zone thus presently being in a heating stage, said desorbate having been obtained by desorption of a quantity of said constituent from a body of said adsorbent, simultaneously applying vacuum to a third zone containing a body of said adsorbent that has just previously been in a heating stage, thereby removing traces of said adsorbed constituent therefrom, said third zone thus presently being in an evacuation stage, simultaneously cooling a fourth zone containing a body of said adsorbent that has just previously been in an evacuation stage, said cooling being accomplished by circulating raffinate through said fourth zone, and thereafter periodically changing each of said zones in a consecutive manner from the adsorption stage, the heating stage, the evacuation stage and the cooling stage.

2. Process as defined by claim 1 including the step of transferring heat by indirect heat exchange from the stream of raffinate leaving a zone that is in the cooling stage and the stream of desorbate flowing into a zone that is in the heating stage.

3. Process as defined by claim 1 wherein the temperature in said adsorption stage is in the range of from about 200° to about 500° F. and wherein the temperature in said heating stage is in the range of from about 500° to about 800° F.

4. Process as defined by claim 1 wherein the final temperature in said adsorption stage is about 380° F. and the final temperature in said heating stage is about 600° F.

5. Process as defined by claim 1 wherein said feed mixture is a hydrocarbon mixture containing normal paraffins and said adsorbent comprises 5 A. molecular sieves.

6. Process as defined by claim 1 wherein said feed mixture is a hydrocarbon mixture containing aromatics and wherein said adsorbent comprises 13 A. molecular sieves.

7. Process as defined by claim 1 wherein said feed mixture is a naphtha boiling in the gasoline boiling range.

References Cited in the file of this patent

UNITED STATES PATENTS

| | | |
|---|---|---|
| 2,797,190 | Scott et al. | June 25, 1957 |
| 2,818,455 | Ballard et al. | Dec. 31, 1957 |
| 2,834,429 | Kinsella et al. | May 13, 1958 |
| 2,870,230 | Scott et al. | Jan. 20, 1959 |
| 2,920,037 | Haensel | Jan. 5, 1960 |